United States Statutory Invention Registration [19]

[11] Reg. Number: H575

Kerfoot et al.

[43] Published: Feb. 7, 1989

[54] LIGHT-WEIGHT NON-SATURATING SPACED CORE INDUCTOR

[75] Inventors: Charles S. Kerfoot, Pasadena; Walter E. Milberger, Severna Park, both of Md.

[73] Assignee: The United States of America as represented by the Secretary of the Army, Washington, D.C.

[21] Appl. No.: 189,459

[22] Filed: Apr. 25, 1988

[51] Int. Cl.[4] ..... B32B 15/10; B22F 7/00; H01F 27/24

[52] U.S. Cl. ..... 428/464; 336/219; 428/549; 428/548

*Primary Examiner*—Stephen C. Buczinski
*Assistant Examiner*—Linda J. Wallace
*Attorney, Agent, or Firm*—John C. Garvin, Jr.; Freddie M. Bush; James T. Deaton

[57] ABSTRACT

The light weight non-saturating spaced core inductor that is made of alternate layers of magnetic and light weight non-magnetic materials to provide a structure that is light in weight yet has the non-saturating inductor characteristics required for certain circuits that are subject to over-load.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIGHT-WEIGHT NON-SATURATING SPACED CORE INDUCTOR

DEDICATORY CLAUSE

The invention described herein was made in the course of or under a contract or subcontract thereunder with the Government and may be manufactured, used, and licensed by or for the Government for governmental purposes without the payment to us of any royalties thereon.

BACKGROUND OF THE INVENTION

In the past several years, choke input type of feed has been heavily promoted and shown to be a large contributor to increased reliability in certain circuits. The increased reliability is a result of the choke limiting the current that is usually not limited through the particular switching device during switch through such as i11ustrated by applicant in FIG. 1. Accordingly, devices of this type are now used almost exclusively throughout the industry in circuits of this type. Currently used choke type devices are relatively heavy and therefor there is a need for a successful device that will perform the function desired yet be of a very light structure Therefore, it is an object of this invention to provide a choke structure that is made of a laminated structure that is light in weight.

Another object of this invention is to provide a structure that is applicable to use as a straight bar structure or as a generally "c" shaped large air gap type structure.

Other objects and advantages of this invention will be obvious to those skilled in this art.

SUMMARY OF THE INVENTION

In accordance with this invention, a light weight nonsaturating spaced core inductor is provided that includes metal conductors with light insulating material sandwiched between the metal layers to provide a much lighter weight core but one that still has the capability of performing the functions desired.

DESCRIPTION OF THE PREFERRED EMBODIMENT

Figure 1:
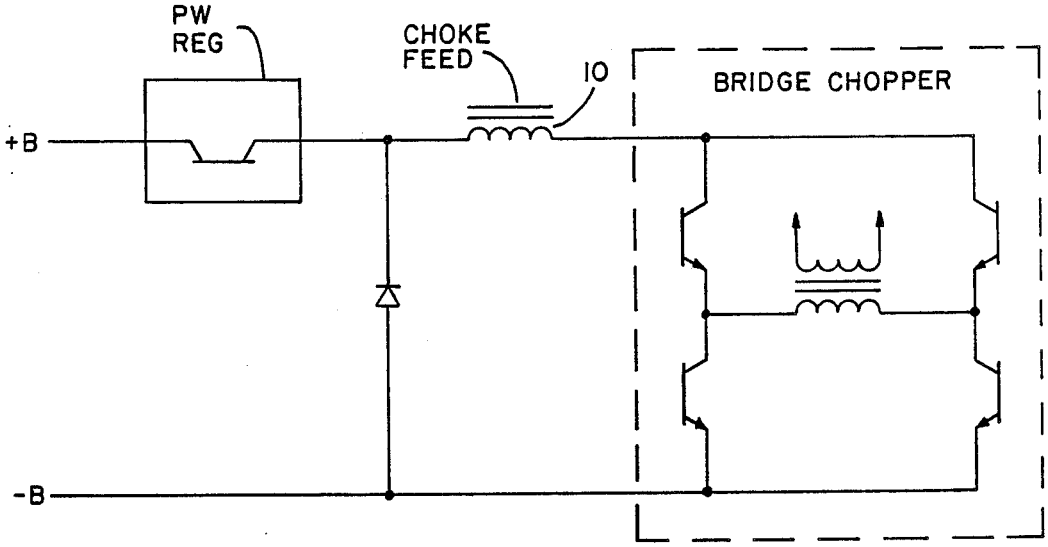
FIG. 1 is a schematic circuit diagram of a choke input chopper in which a choke feed in accordance with this invention can be used.
Figure 2:
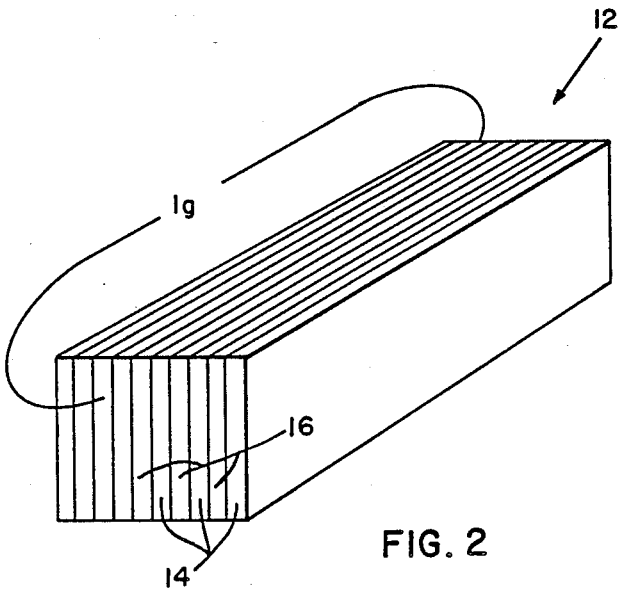
FIG. 2 is a light weight spaced core of an elongated structure in accordance with this invention.

Referring now to the drawing, FIG. 1 illustrates a circuit in which a choke feed 10 is utilized for limiting the current in the circuit in a conventional manner. In FIG. 2, applicants' specific structure of a desired core 12 is illustrated and includes alternate layers of silicon steel laminations 14 and insulator layers 16 such as paper that can be made of pressed board type spacers. A straight bar type core, as illustrated in FIG. 2, has a very large air gap $L_g$ as illustrated.

Figure 3:
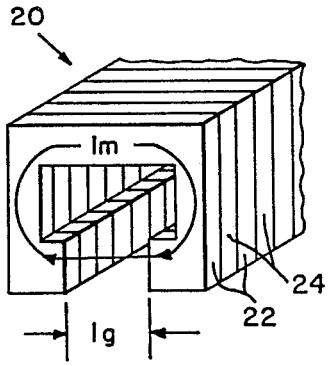
FIG. 3 is a C-core of a light weight spaced core in accordance with this invention.

Another arrangement for the choke feed can be a C-core structure 20 as illustrated in FIG. 3 in which the C-core is made up of alternate layers of silicon steel laminations 22 and insulator layers made of paper such as pressed board spacers 24. This C-core 20 has a large air gap $L_g$ as illustrated but not on the same order as a straight bar as illustrated in FIG. 2.

The specific structure of the choke feed cores in accordance with this invention have been specifically developed to drastically reduce the weight of such core inductors by taking advantage of the large air gap ($L_g$) The air gap in the magnetic circuit increases the reluctance.

When the air gap is very large, it becomes the controlling influence on the amount of flux that can be generated for a given number of ampere turns.

$$\text{EQUATION: } B \approx \frac{NI\mu}{l_e} \qquad \text{(equation 1)}$$

shows the relationship of flux density (B) versus the effective magnetic path length ($l_e$) The effective length ($l_e$) of the magnetic path is equal to the actual magnetic path length ($l_m$) plus the product of the permability ($\mu$) of the core material times the air gap length ($l_g$)

$$l_e = l_m + \times l_g) \text{ (equation 2)}$$

where:

$l_e$=effective magnetic path length $l_m$=magnetic path length in core material $l_g$=air gap length When the product of $(\mu)\times(l_g)$ is very large in comparison to the magnetic core path length, the effective path length ($l_e$) is approximately equal to the permability times the air gap lenqth. So substituting $(\mu)\times(l_g)$ in equation (1 ) for ($l_e$), the flux density (B) is inversely proportional to the air gap length only, since ( $\mu$) drops out:

$$B = \frac{NI}{l_g} \qquad \text{(equation 3)}$$

where: $l_m(\mu_{av})(l_g)$. $(\mu_{av})$ is equal to the effective permeability Of the core. The approximation can be considered satisfactory if $$(\mu_{av})\times(l_g)=(200)\times(l_m).$$

Thus ( $\mu_{av}$) becomes $[(200)\times(l_m)](l_g)$. To provide an average permeability of 200, only 6.7% of the core material needs to be silicon steel when spaced laminations are used. This number is determined by the ratio of the required average permeability to that of silicon steel. That is $$\frac{(\mu_{av})}{(\mu \text{ silicon steel})} = \frac{200}{3000} = 6.7\%$$

This assumes a permeability of 3,000 for silicon steel. Using transformer pressboard for the non-magnetic spacers, a weight savings of about 90 percent is realized over solid silicon steel laminate core structure. Considering copper, the weight (initially 50%), an overall weight savings of 45% results for a composite inductor.

Inductors tested on Roadrunner breadboard have been made in accordance with this invention and, they verify that the inductance remains the same and that the weight savings claimed in this disclosure is realized.

We claim:

1. A light weight non-saturating spaced core inductor including a core structure made of alternate layers of magnetic material and non-magnetic material to form a light weight core.

2. A light weight non-saturating spaced core inductor as set forth in claim 1, wherein said magnetic material comprises about 6.7% of said core.

3. A light weight non-saturating spaced core inductor as set forth in claim 1, wherein said magnetic material is laminated silicon steel and said non-magnetic material is paper pressed board.

4. A light weight non-saturating spaced core inductor as set forth in claim 1, wherein said magnetic material is solid silicon steel laminate of about 6.7% and the remainder is said non-magnetic material of paper pressed board.

* * * * *